(No Model.)
A. BERGH.
PROCESS OF AERATING AND PURIFYING BEER WORT OR BEER.
No. 414,673. Patented Nov. 12, 1889.
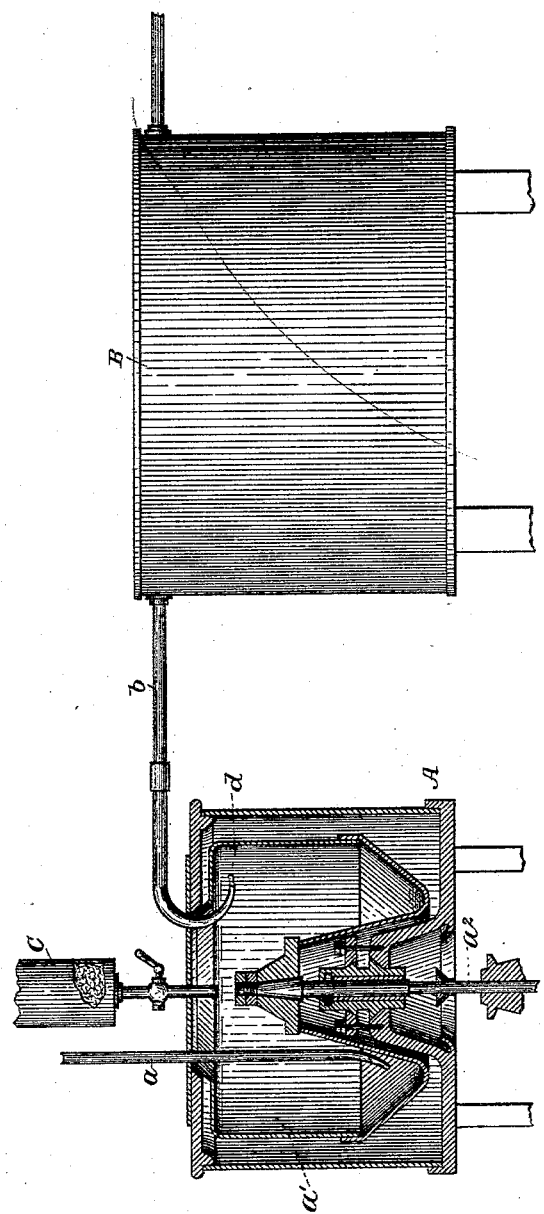
Attest:
Ino. D. McGill.
Walter Scott.
Inventor:
Axel Bergh
By Paine & Ladd,
attys.

UNITED STATES PATENT OFFICE.

AXEL BERGH, OF COPENHAGEN, DENMARK.

PROCESS OF AERATING AND PURIFYING BEER-WORT OR BEER.

SPECIFICATION forming part of Letters Patent No. 414,673, dated November 12, 1889.

Application filed February 7, 1889. Serial No. 299,070. (No specimens.)

*To all whom it may concern:*

Be it known that I, AXEL BERGH, a subject of the King of Sweden, residing at Copenhagen, in the Kingdom of Denmark, have invented certain new and useful Improvements in Processes of Aerating and Purifying Beer-Wort or Beer; and I do hereby declare the following to be a full, clear, and exact description of the invention, such as will enable others skilled in the art to which it appertains to make and use the same.

The developments effected in the brewing industry have latterly been, and will in the future still be, directed toward the elimination of the micro-organisms, which may be considered as the enemies of beer. In this endeavor the centrifugal machine, as is shown by the present invention, will play an important part. A main condition in brewing is that both the wort and also the beer shall only come in contact with a certain description of ferment, which is added to the wort in order to induce the general fermenting process. This can only be effected when the wort is conducted in a sterilized condition to the fermenting-house—that is to say, free from living organism of all kinds. It is therefore necessary that the wort that has become sterilized by boiling shall not have foreign organisms introduced into it while cooling and undergoing aeration, this being unavoidable in the processes now in use.

Hansen's air analyses from 1879 to present day show that the air is filled with germs that are detrimental for the wort. From this it follows (and this is also proved by experience) that it is practically impossible while using cooling-backs to conduct the wort in a sterilized condition to the fermenting-houses. It has therefore been attempted to employ tubular cooling apparatus instead of the cooling-backs, but without obtaining sufficiently good results, as the admission of air, and consequently the aeration of the wort, was not sufficient, resulting in an irregular fermentation. With other cooling apparatus the air-supply is doubtless sufficient, but the air is not pure, whereby the detrimental organisms become introduced into the wort and pass with the same to the fermenting and storing houses. Before the fermentation the wort must not only be cooled, but at the same time the suspended matter must be separated and a sufficient quantity of pure air must be taken up. This threefold operation can be carried out by means of the apparatus shown on the accompanying drawing.

A is a centrifugal machine, and B a cooling apparatus, which may be of any suitable known construction.

The wort is conducted directly from the hop-vat to the centrifugal machine through the pipe $a$, and is deposited in a drum or shell $a'$, rigidly secured upon the upper end of a rotating shaft $a^2$, to which power is applied. The substances suspended in the wort are separated by centrifugal action effected by the rapid revolution of shaft $a^2$ and drum or shell $a'$, and the wort is caused to pass at $d$ into the pipe $b$, in which it flows into the cooling apparatus B.

The centrifugal machine is rendered air-tight by any suitable means, and communicates with the outer atmosphere only through a pipe provided with a cock and a cylindrical receptacle $c$. In this receptacle is a cotton wort-filter, or a filter of any other suitable sterilizing material, so that the entering outer air is filtered, and consequently sterilized, before it comes in contact with the wort. The air-supply can be regulated by the cock.

The advantages of my invention will be apparent to those skilled in the art to which it appertains, and it will be particularly seen that the wort is led to the fermenting-house in an absolutely-sterilized condition, while at the same time it is cooled, aerated to the required degree, and freed from impurities, and the losses due to residual wort are avoided.

It will be readily understood that the wort may be made to pass through the cooling apparatus as well before as after the centrifugal operation.

The after fermentation in the storage-casks is just as important for the proper preservation and quality of the beer as the principal fermentation.

In the artificial ferment there will always be mixed some wild ferment, which is consequently introduced into the wort together with the other ferment. During the first stage of the fermenting process no cells of wild ferment will be found in the upper layer of the wort, as they only show themselves toward the end of the process, for which reason the larger portion thereof remains in the beer and passes with it into the storage-casks, where they carry out their destructive action. It would therefore be of importance to be able to separate as perfectly as possible the ferment-cells from the finished fermented beer, and to effect the after fermentation with "hoch kreutz," or ferment which cannot contain any wild ferment. This can be effected by filtration; but this process is not only difficult and troublesome, but also expensive, and is accompanied by no small risk. The centrifugal process, on the other hand, is the surest, cheapest, and simplest method of carrying out this operation. The beer is led directly from the fermenting-vat to the centrifugal apparatus, and from this to the storage-casks; but the centrifugal apparatus is not alone applicable for separating the residual ferment-cells in order to add hoch kreutz ferment. With this process ferment-cells can be employed for the main fermentation which impart to the beer certain properties, but which are not suited for the after fermentation. These cells are afterward separated and the after fermentation is effected by means of suitable descriptions of ferment. The ripeness of the beer for consumption can also be controlled by employing for the after fermentation ferments that clarify either rapidly or slowly. It also happens sometimes that notwithstanding the fermentation has reached the desired point more ferment remains behind than it is desired to introduce into the storage-casks, and the only thing to be done in that case is to allow the fermentation (which is probably a defective one) to continue for some time. If, on the other hand, the cells are separated by means of the centrifugal apparatus, this is of course avoided and the risk of introducing a probably defective ferment into the storage-casks is thus obviated.

From what has been said above it will be readily seen that the use of the centrifugal apparatus will also play an important role in the transference of the beer from the fermenting-vats to the storage-casks.

What I claim, and desire to secure by Letters Patent, is—

The herein-described process of freeing wort from suspended particles by simultaneously subjecting the wort to centrifugal action and a regulated supply of sterilized air, and subsequently cooling the wort preparatory to fermentation, all to be carried out in contact with sterilized air, substantially as described.

In testimony whereof I affix my signature in presence of two witnesses.

AXEL BERGH.

Witnesses:
LAURITZ NIELSEN,
POUL PETERSEN.